United States Patent

Christensen

[11] Patent Number: 5,862,431
[45] Date of Patent: Jan. 19, 1999

[54] TONER POWDER LEVEL SENSING USING ELEMENT AND PULSE SIGNAL AND TONER POWDER PRESENCE SENSING USING PIEZOELECTRIC FILM

[75] Inventor: K. Trent Christensen, Boise, Id.

[73] Assignee: Hewlett-Packard Company, Palo Alto, Calif.

[21] Appl. No.: 845,798

[22] Filed: Apr. 25, 1997

[51] Int. Cl.$^6$ .............. G03G 15/08; G01F 23/22
[52] U.S. Cl. .............. 399/27; 73/290; 310/330; 310/366
[58] Field of Search .............. 399/27, 30, 61; 310/330, 366, 321; 73/290 V

[56] References Cited

U.S. PATENT DOCUMENTS

| 4,159,786 | 7/1979 | Biddle, III et al. | 222/64 |
|---|---|---|---|
| 4,314,242 | 2/1982 | Kuru et al. | 340/617 |
| 4,570,482 | 2/1986 | Murata et al. | 73/290 V |
| 5,495,315 | 2/1996 | Cherian | 399/61 |

FOREIGN PATENT DOCUMENTS

| 61-149826 | 7/1986 | Japan . |
|---|---|---|
| 61-213635 | 9/1986 | Japan . |
| 6-83197 | 3/1994 | Japan . |

Primary Examiner—Joan Pendegrass

[57] ABSTRACT

A toner detecting system includes an image forming apparatus having a toner reservoir. A toner sensor of the system has a toner sensing element of piezoelectric material, the toner sensor carried within the toner reservoir to detect a toner level condition. A driver of the system is disposed to structurally excite at least a portion of the toner sensor when the portion is not immersed in toner, the excited at least a portion stressing the toner sensing element so as to impart a detectable output signal indicative of flexing of the toner sensor. A detector of the system is configured to receive the detected output signal and detect the toner level condition.

20 Claims, 6 Drawing Sheets

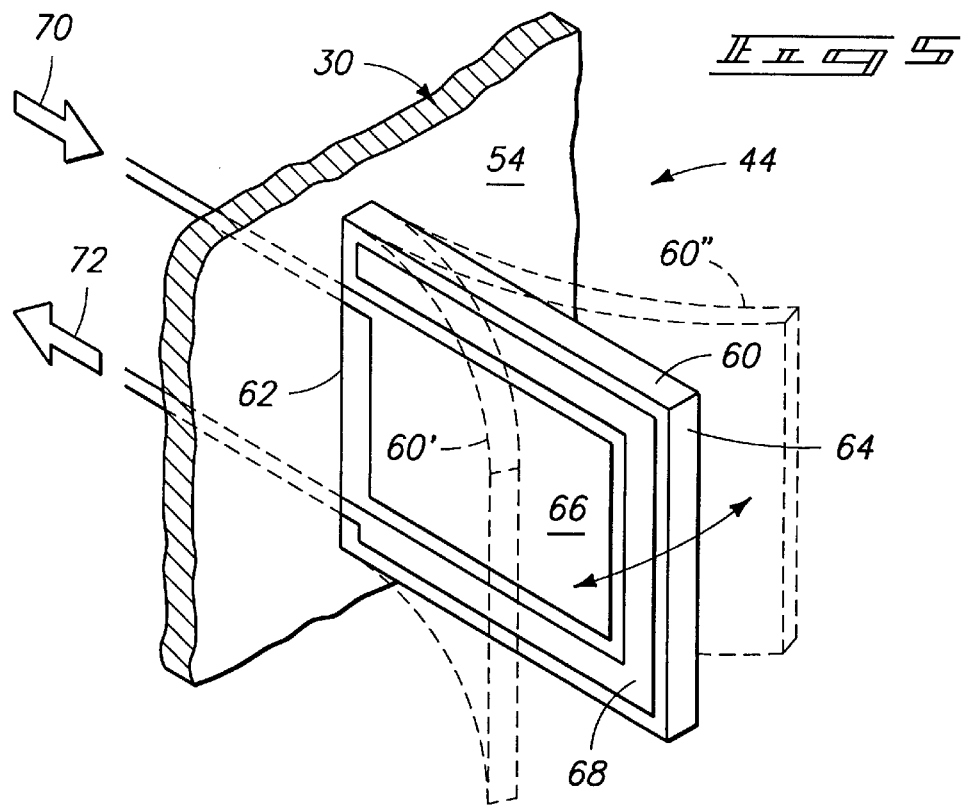
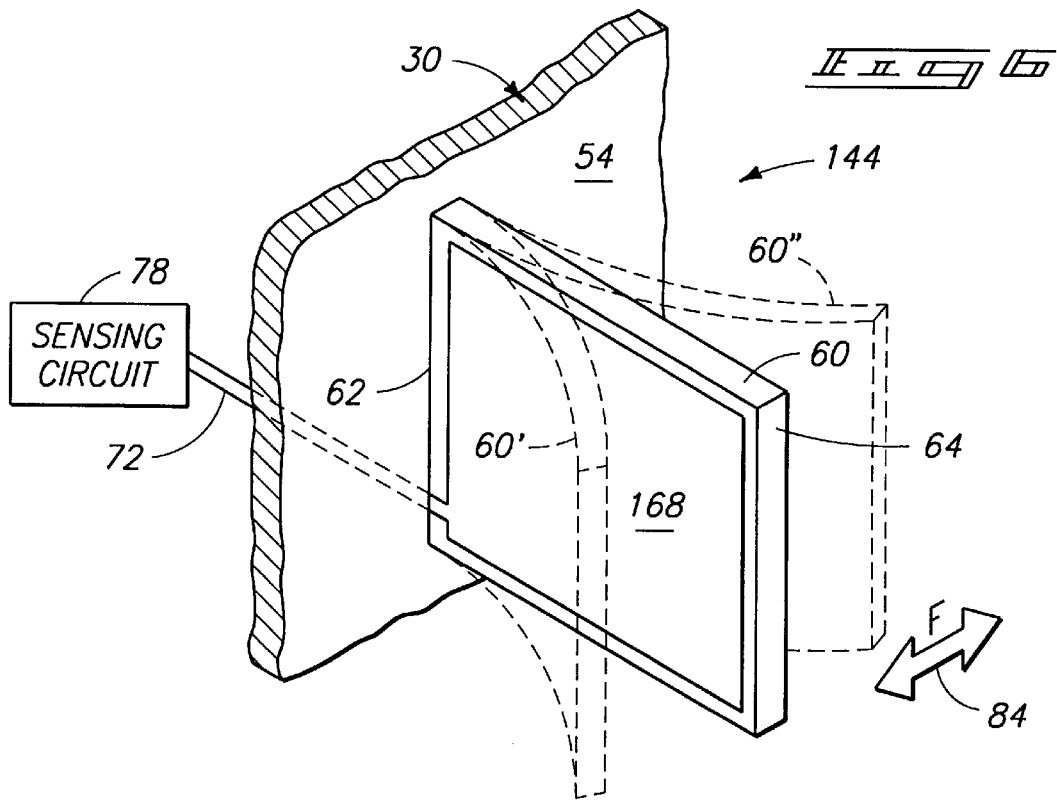

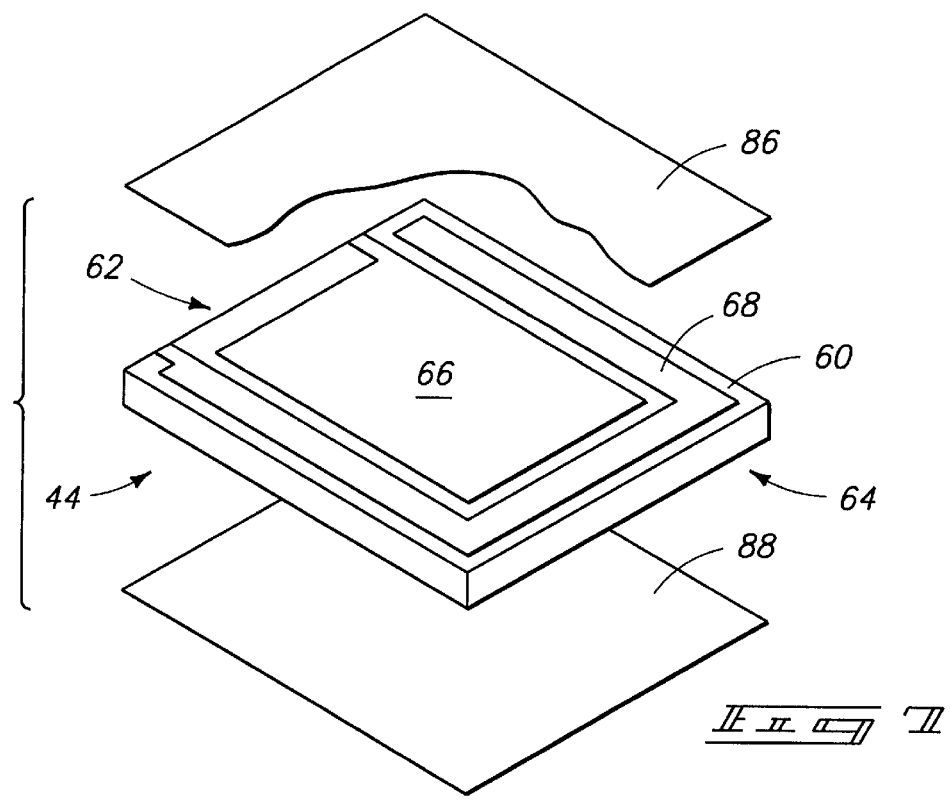
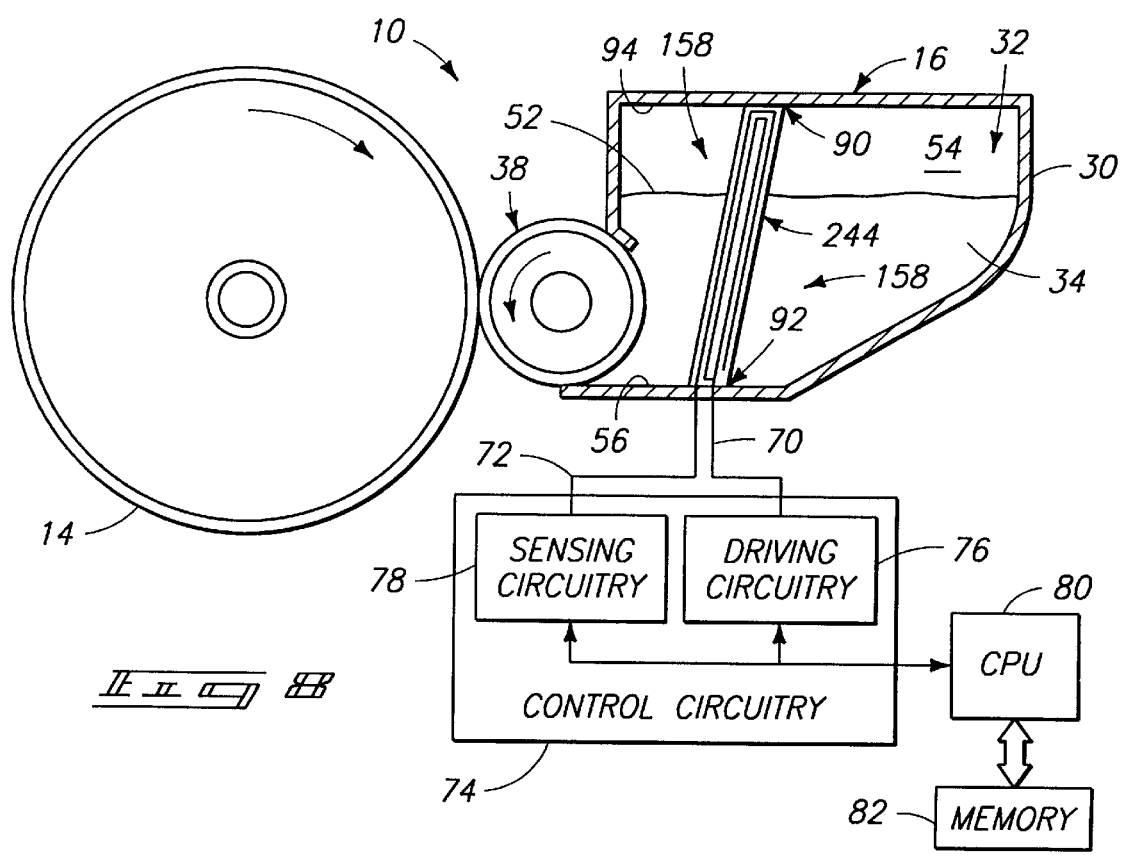

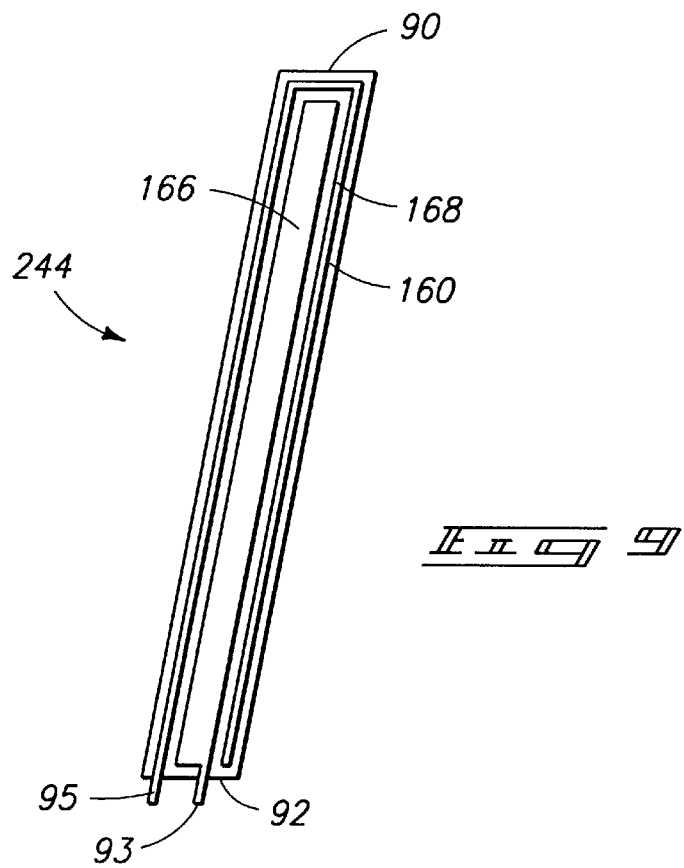
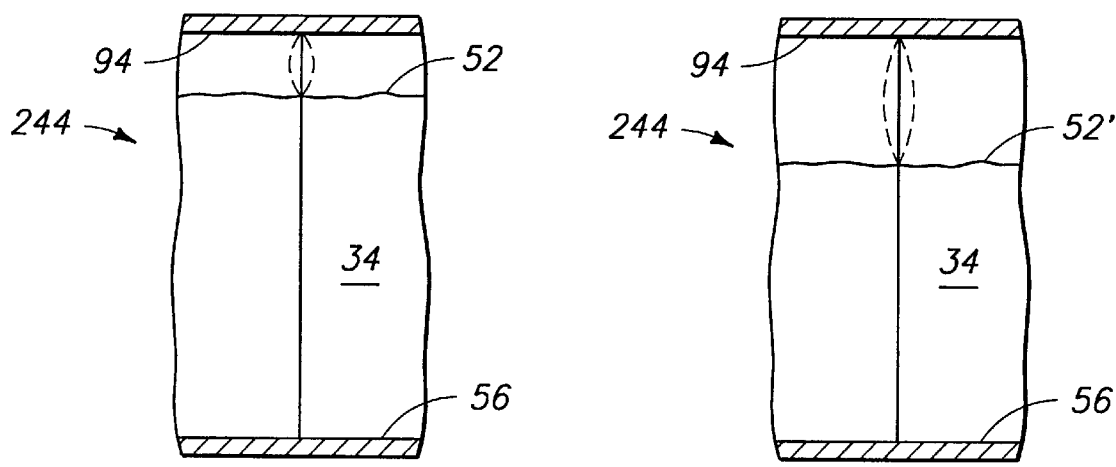

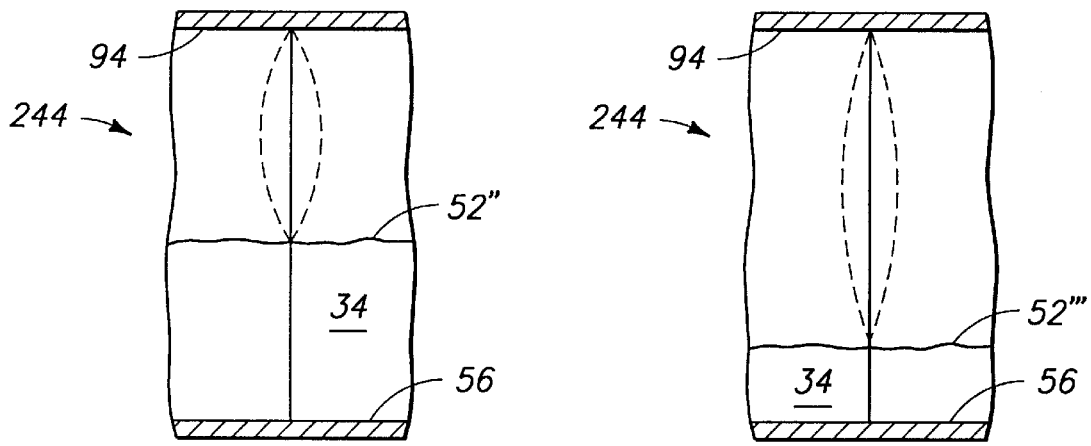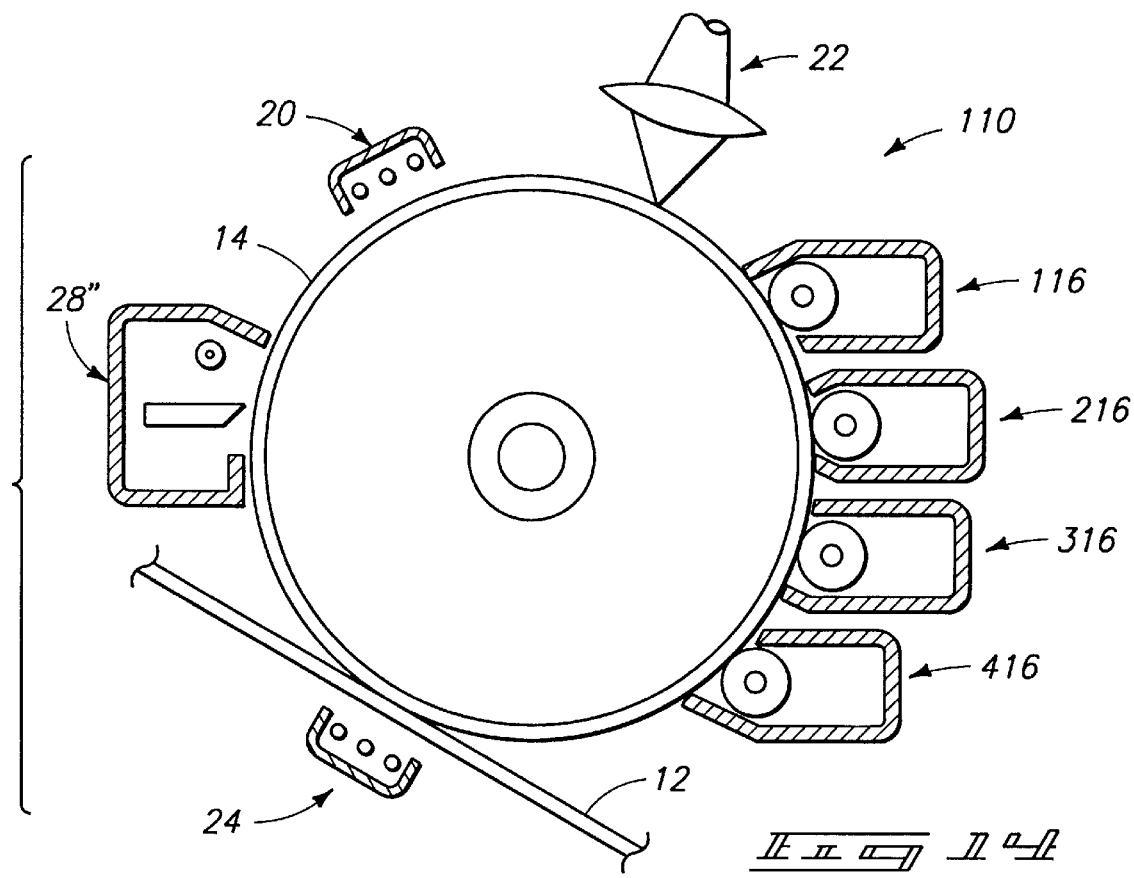

TONER POWDER LEVEL SENSING USING ELEMENT AND PULSE SIGNAL AND TONER POWDER PRESENCE SENSING USING PIEZOELECTRIC FILM

FIELD OF THE INVENTION

This invention relates generally to image forming apparatus such as printers, and more particularly to systems for detecting toner within an image-forming apparatus.

BACKGROUND OF THE INVENTION

A typical image-forming apparatus such as a printer or a copier that uses electrophotographic, ionographic, or magnetographic technologies frequently uses powder toner development of an intermediate image created in the forming process. With any of these image-forming technologies, a supply of powder toner is stored in a toner reservoir from which it is delivered via a developer roll and metering blade to a photoconductor drum.

For the case of electrophotographic printing, a photoconducting drum is first electrostatically charged; the photoconductor drum is then exposed to the image light pattern, which selectively discharges regions on the previously charged drum; the photoconductor drum is developed by delivering electrostatically charged toner particles to the surface of the drum where the charged particles selectively adhere to appropriately charged regions; the electrostatically transferred toner image on the drum is transferred to the paper (or other carrier medium); the toner is thermally fused to the paper; and any residual toner is cleaned from the surface of the photoconductor drum prior to reinitiation of the process. Such process is applicable for write-black printers as well as write-white printers.

According to the above steps, the delivery of powder toner to the photoconductor drum is referred to as development. Two different development techniques utilize powder toner; namely, a dual component and a mono component development technique. The dual component technique was most commonly utilized prior to the advent of electrophotographic printers designed for personal and work station computer use. However, the technique is still found in high-end printers. This technique requires the use of toner particles and carrier beads which must be provided in a supply reservoir. The other technique, referred to as mono component development, is used almost exclusively for low-end printers because the use of carrier beads is not required. However, such systems utilize powder toner, which is usually provided in a replaceable toner/developer cartridge. Hence, powder toner is supplied via a toner reservoir.

According to either development technique, there is a need to sense the level of toner available within a toner reservoir in order to monitor and/or predict the level of available toner and the available printing life, respectively. One previously utilized technique of sensing available toner level on a printer has been implemented in the form of an antenna. A metal rod is positioned to run parallel with a development sleeve in the toner reservoir at a distance of about five millimeters. The metal rod couples with an electrical field that is generated by an alternating current induced electrical bias of the development sleeve. Associated circuitry is provided to sense the change in field strength resulting from decreases in toner level between the rod and the sleeve. Such a system proves relatively inexpensive, but is only capable of sensing toner at, or near, the end of life for a toner cartridge. Typically, such a system is only capable of sensing end of life for a toner cartridge when less than five percent of the toner still remains within the cartridge. Additionally, the antenna is required to remain adjacent, or near, the development sleeve or else signal strength is lost when the antenna is positioned any further away from the development sleeve.

An alternative technique for sensing toner level involves the use of emitter and detector pairs that have been configured to sense the presence of toner within a toner supply reservoir. Such a technique requires the use of a viewing window and a wiper, the wiper being used to frequently clean toner from the window. The emitter and detector pairs are used to detect the presence of toner via a window. However, the window and emitter/detector pairs are subject to toner contamination which can render them ineffective at sensing the presence of toner via a window. Additionally, optical sensing systems such as an emitter/detector pairs typically have a significant amount of noise in the detected signal as toner flow and clouding may affect their accuracy. Even furthermore, optical sensing systems require that the wiper stir and squeegee the toner adjacent the viewing window in order to keep the toner from accumulating in front of the viewing window. However, the construction of the necessary mechanical parts proves to be complicated and expensive.

Both of the above-mentioned sensing systems are capable of detecting the presence of toner. However, as toner capacity has increased and printers have been put on networks, the monitoring of available toner level has become an important consideration in the management of printer performance.

SUMMARY OF THE INVENTION

It is therefore an object of the present invention to overcome the above deficiencies and disadvantages of the prior art and to provide a toner detecting system for use with image-forming apparatus, the toner detecting system including a sensor for detecting the presence of powder, and according to certain implementations, a sensor for detecting the level of toner powder within the toner supply reservoir of the image-forming apparatus.

According to one aspect of the invention, there is provided a toner detecting system, including an image-forming apparatus having a toner reservoir. The toner detecting system also includes a toner sensor having a toner sensing element formed of piezoelectric material. The toner sensor is provided in the toner reservoir of the image-forming apparatus at a location to be immersed within the toner to detect a toner level condition. The toner detecting system also includes a driver disposed to mechanically stress at least a portion of the toner sensor when the portion is not immersed in toner. The flexed portion stresses the toner sensing element so as to impart a detectable output signal indicative of flexing of the toner sensor. Additionally, the toner detecting system includes a detector for receiving the detected output signal and detecting the toner level condition as an absence of toner adjacent the toner sensor.

According to another aspect of the invention, there is provided a printing device having an electrostatic image-carrying device for carrying a latent image. The printing device also includes a developing unit for developing the latent image. Even further, the printing device includes a toner supply reservoir for supplying toner. Yet even further, the printing device includes a toner presence-detecting system including the toner sensor having a toner sensing element of piezoelectric material. The toner sensor is provided in the toner reservoir of the image-forming apparatus at a location to be immersed within toner to detect a toner level condition. The toner-presence detecting system also includes a driver disposed to mechanically stress at least a portion of the toner sensor when the portion is not immersed in toner. The flexed portion stresses the toner sensing element so as to impart a detectable output signal indicative of flexing of the toner sensor. The toner-presence detecting system also includes a detector for receiving the detected output signal and detecting the toner level condition as an absence of toner adjacent the toner sensor.

According to yet even another aspect of the invention, there is provided a method for detecting a toner-presence condition, including the steps of providing a piezoelectric toner sensor within a toner supply reservoir of an image-forming apparatus, and detecting the presence of toner in a developing machine and providing signals indicative thereof.

Other objects, features and advantages of the invention will become apparent in the following specification and accompanying drawings.

BRIEF DESCRIPTION OF THE DRAWINGS

FIG. 5 is an enlarged partial breakaway perspective view illustrating a toner sensor of FIGS. 3 and 4;

FIG. 6 is an enlarged partial breakaway perspective view illustrating an alternative toner sensor for use in the toner detecting system of FIGS. 3 and 4;

FIG. 7 is an enlarged exploded perspective view of the toner sensing element of the toner sensor of FIG. 5;

FIG. 8 is a schematic and partial vertical sectional view outlining an alternative toner detecting system for use in a toner cartridge;

FIG. 9 is an enlarged elevational view of the toner sensor of FIG. 8; and

FIGS. 10–13 are various elevational and simplified schematic views outlining the vibration characteristics of the toner sensor according to FIG. 8, with various corresponding levels of toner provided within the toner supply reservoir.

FIG. 14 is a schematic and partial vertical sectional view of a printing device having a plurality of monocomponent developer systems each having a dedicated color, the plurality configured to cooperate when printing color.

DETAILED DESCRIPTION OF THE PREFERRED EMBODIMENT

This disclosure of the invention is submitted in furtherance of the constitutional purposes of the U.S. Patent Laws "to promote the progress of science and useful arts". U.S. Constitution, Article 1, Section 8.

Figure 1:
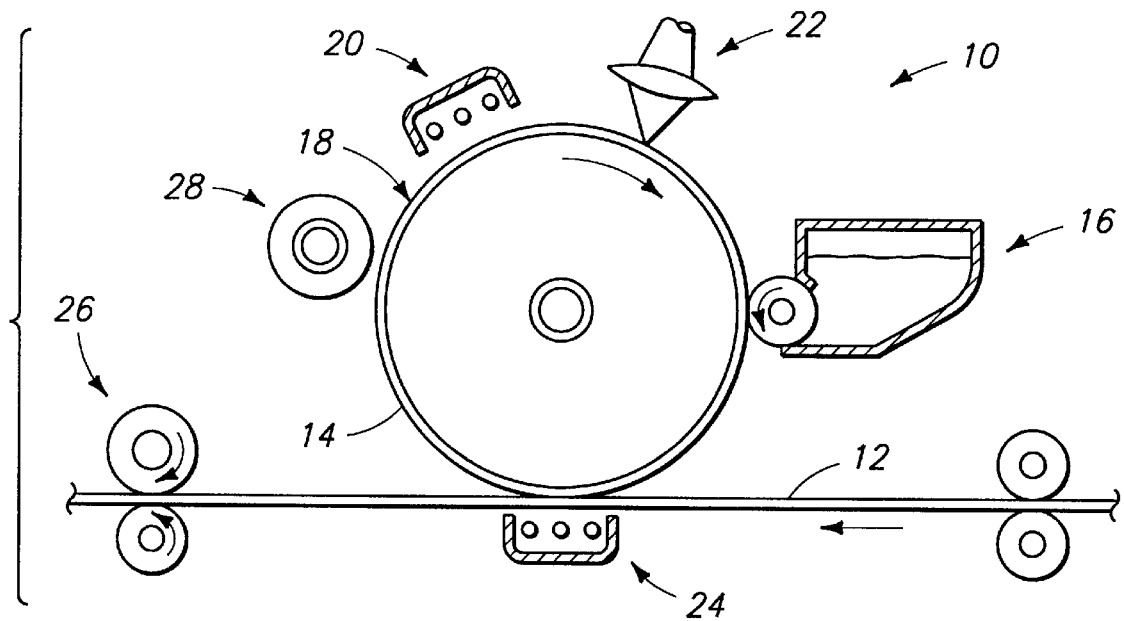
FIG. 1 is a schematic view of an electrophotographic printer process.

FIG. 1 illustrates an image-forming apparatus in the form of an electrophotographic printing device 10 for depositing laser generated images onto a piece of paper 12. In another configuration, the image-forming apparatus is a plain paper copier. According to the former, an electrophotographic printer utilizes a solid-state laser which scans across and exposes a photoconductor drum 14 creating a latent image on the photoconductor drum 14. Subsequently, powder toner cartridge 16 deposits toner along the latent image of drum 14.

According to FIG. 1, printing device 10 performs a complete cycle of image-forming operations with each complete revolution of photoconductor drum 14. Beginning with a process initiation point 18 on drum 14, a charging corona, or a charge roller, 20 electrostatically charges the photoconductor on drum 14. Subsequently, a combination printer and imaging optics array 22 exposes the photoconductor on drum 14 with an image light pattern, resulting in selective discharge of the previously uniformly charged area created in the previous step, resulting in an electrostatic image. Toner cartridge 16 then delivers electrostatically charged powder toner particles (either black or colored) to the photoconductor surface on drum 14, developing the photoconductor where the particles selectively adhere to appropriately charged regions. A second charging corona 24 charges the back side of paper 12 such that toner is transferred from the photoconductor drum 14 to paper 12 where paper 12 and drum 14 contact in the region of charging corona 24. Subsequently, a fusing station 26 thermally fuses the transferred powder toner to paper 12. Finally, a cleaning station 28 cleans any residual toner from the surface of photoconductor drum 14, enabling reinitiation of the cycle beginning with process initiation point 18.

Especially for the case of mono component development as used in low-end printers, toner cartridge 16 forms a replaceable toner/developer cartridge which enables a user to replace toner when the cartridge has been emptied. Cartridge 16 enables relatively quick and easy toner replacement by a user.

Figure 2:
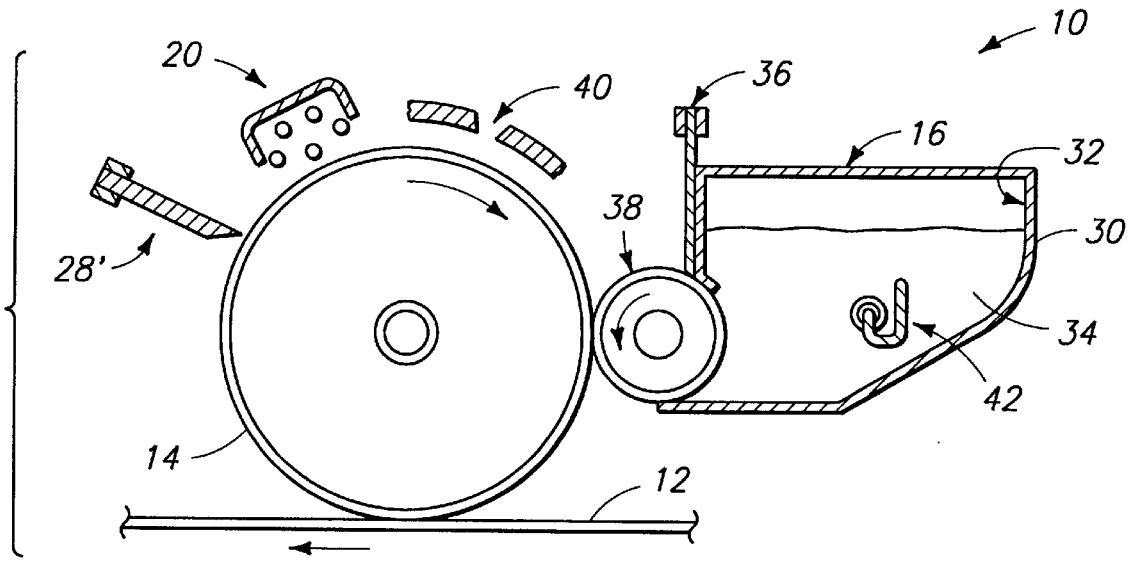
FIG. 2 is a schematic and partial vertical sectional view of a printing device having a mono component developer system.

According to FIG. 2, such a replaceable toner cartridge 16 is depicted in use in a printing device 10. Toner cartridge 16 includes a cartridge housing 30 preferably formed from plastic material. A toner supply reservoir 32 is formed within housing 30 where a supply of powdered toner 34 is stored for later use. A metering blade 36 co-acts with a developer roll 38 to deliver a metered amount of powdered toner 34 along developer roll 38 where it is transferred to the surface of photoconductor drum 14 along charged regions. Developer roll 38 preferably comprises a rotating toner/development roll having appropriate charging properties that are employed to charge toner 34 by way of touch and rubbing contacts. Accordingly, toner 34 electrostatically adheres to roll 38 along which it is transported to contact the photoconductor drum 14 at the nip of the drum and roll. Optionally, roll 38 is separated by a gap from drum 14, with toner 34 jumping the gap during transfer due to a charge attraction. In the presence of a charge-biased development field, delivered toner 34 is selectively transferred to those areas of the photoconductor drum having an opposite sign charge.

Also according to FIG. 2, features of a printhead/imaging optics assembly are shown in simplified form as an imaging slot 40 through which a laser can optically deliver a charge-defining image. Additionally, a cleaning station is shown in the form of a cleaning blade 28' for scraping the outer surface of photoconductor drum 14 clean therealong. Cleaning station 28' can also include a cleaning roll provided adjacent the blade. The charged image is then delivered from drum 14 onto paper 12, where it is deposited and fused.

One suitable method for fusing the delivered toner onto paper 12 involves the application of heat and pressure produced at the nip of a pair of rollers. Also according to FIG. 2, a mixing paddle 42 is preferably provided within reservoir 32 to facilitate delivery of the powdered toner 34 to roll 38, preventing compaction and maintaining a loose and available supply of toner 34.

Figure 3:
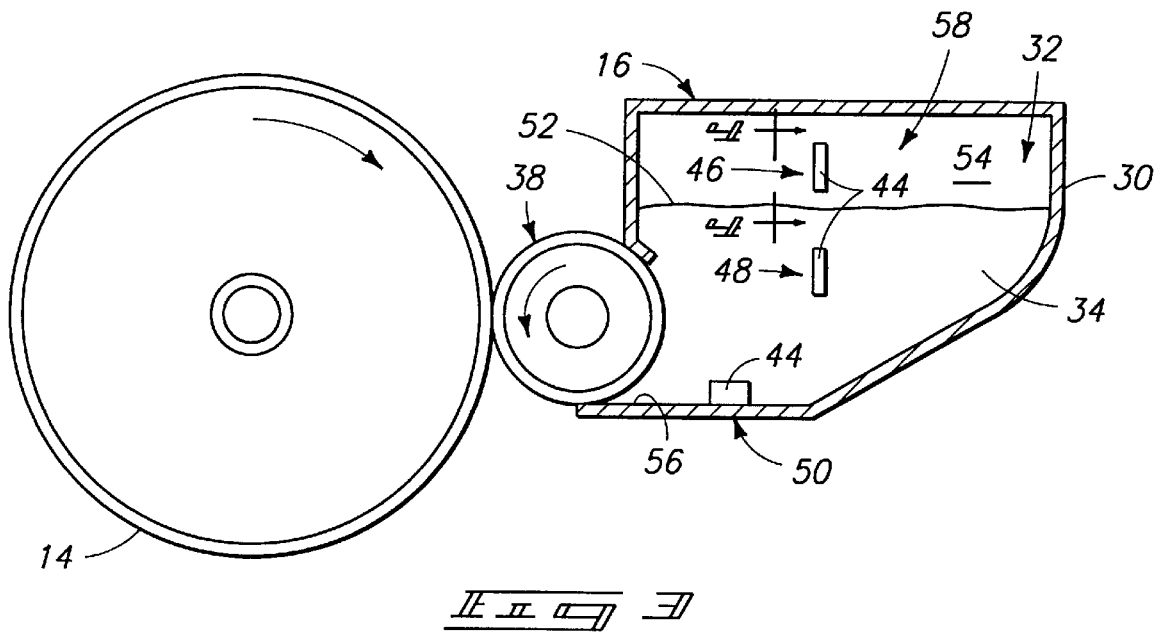
FIG. 3 is a schematic and partial vertical sectional view of selected portions of the printing device 10 of FIG. 2 illustrating the toner detecting system.

FIG. 3 illustrates toner cartridge 16 as it is normally placed in adjoining position along photoconductor drum 14, but with the additional feature of a toner sensor 44 provided at each of locations 46, 48 and 50. Sensor 44 if configured in the shape of a cantilever beam that is excited in order to determine whether or not it is immersed in toner 34. When toner 34 is present, the toner damps movement of sensor 44 to a detectable level. Location 46 is provided along a side wall 54 of housing 30 at an elevational level which indicates when toner level 52 is at a high level. Sensor location 48 is positioned along side wall 54 to indicate a toner level which is at approximately a half-full level. Sensor location 50 is provided on a bottom surface of housing 30 to indicate a toner level 52 that is at a nearly empty level.

As toner level 52 drops within supply reservoir 32, sensors 44 become free from immersion in toner 34, enabling sensors 44 to move freely. Accordingly, sensor 44 at sensor location 46, upon being freed from the constraints of toner 34, detects a lack of toner therealong. Subsequently, as toner level 52 drops even further, sensor 44 at sensor location 48 also becomes free from the constraints of toner 34, producing a detectable signal that indicates a lack of toner at that location. Finally, sensor 44 at sensor location 50 also becomes free of the constraints of toner 34, producing a detectable signal that indicates the condition of a nearly empty supply of toner 34 within reservoir 32.

According to the construction of FIG. 3, sensors 44 can be provided in any of a number of locations positioned at discrete elevations within reservoir 34. An increased number of sensors can be provided when it is desirable to detect toner level with a greater number of detectable incremental toner levels. Alternatively, a single toner sensor 44 can be utilized. Optionally, a modified single sensor can be utilized according to the teachings of FIGS. 8–10, below, enabling a detection of not only the presence of toner at each location, but also the actual level of toner present within the reservoir.

Figure 4:
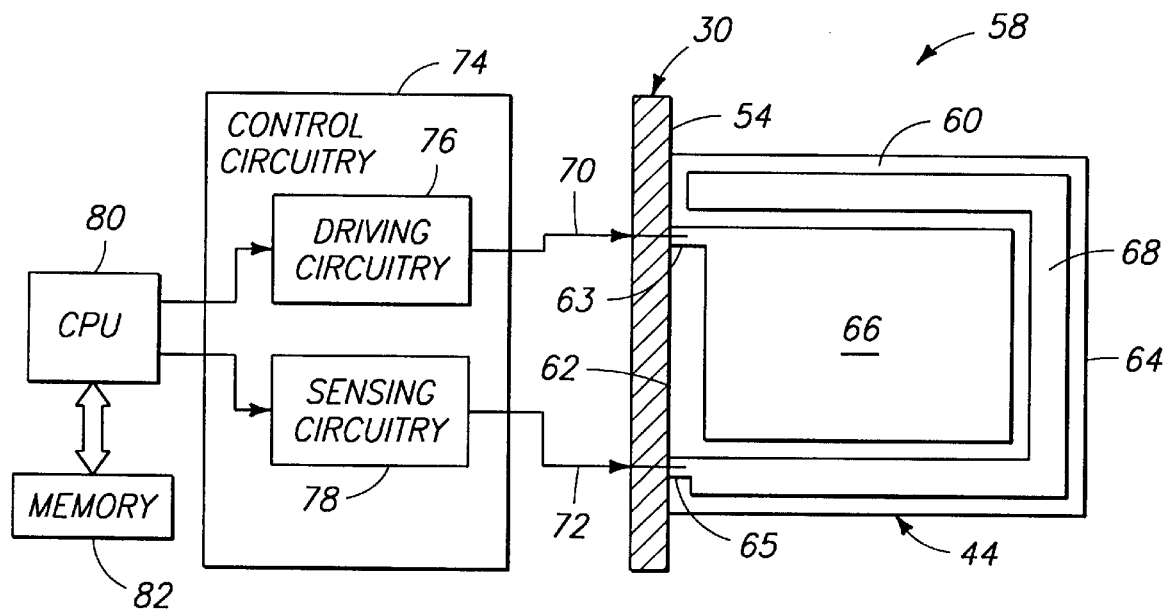
FIG. 4 is a schematic and partial sectional view taken along line 4—4 of FIG. 3 illustrating a toner detecting system with a toner sensor.

According to FIG. 4, a toner detecting system 58 of this invention is formed by toner sensor 44 which is mounted along side wall 54 of housing 30 and provided with associated control circuitry 74. Preferably, control circuitry 74 is implemented on an Application Specific Integrated Circuit (ASIC). According to the construction of this invention, toner sensor 44 is formed from a toner sensing element 60 comprising a piezoelectric device such as a piezoelectric film element. As shown in the embodiment of FIG. 4, toner sensing element 60 is preferably formed from a thin square, or rectangular, shaped piece of piezoelectric film element having a fixed edge 62 that is secured to side wall 54 and an opposed free edge 64 that extends out into a reservoir for containing toner. Preferably, fixed edge 62 is provided with an edge mounting surface to facilitate securing and mating of toner sensor 44 to wall 54.

Preferably, a fastening or clamping member (not shown) locally enforces element 60 where it attaches to side wall 54 such that element 60 does not flex immediately adjacent to wall 54. Instead, element 60 flexes outward of wall 54, in the presence of sensing electrode pad 68. Otherwise, flexing of element 60 might occur along edge 62, where it would be substantially out of range and undetectable by sensing electrode pad 68. It is to be understood that element 60, as shown in FIGS. 4–6, has such local enforcement along fixed edge 62. One way is to locally thicken element 60 with a bead of epoxy placed along each side, securing element 60 along fixed edge 62 with wall 54. Another way is to provide a clamping member there along.

As shown in FIG. 4, piezoelectric film element 60 is formed from a piezoelectric material so as to provide a piezoelectric transducer that creates an alternating potential through the flexing of its crystalline element which, when deformed, generates a charge difference proportional to the deformation on the element's opposite surfaces. In order to enhance the collection of charge on either surface of element 60, a driving electrode pad 66 and a sensing electrode pad 68, each formed from conductive material such as metal, are provided on each side of element 60. Preferably, an additional layer of sealing and protective material is also provided, as subsequently shown according to the construction depicted in FIG. 7. To enable charge transfer from the surfaces of element 60, driving electrode pad 66 forms a conductive lead 63 which connects with a drive lead 70 from driving circuitry 76. Likewise, sensing electrode pad 68 forms a conductive lead 65 for connecting with a sensing lead 72 and sensing circuitry 78. Preferably, piezoelectric film element 60 is formed from a sheet of piezoelectric polyvinyledene fluoride polymer (PVDF). However, element 60 can also be formed from any of a number of piezoelectric materials, even in combination with nonconductive materials, as long as a stressed portion of element 60 comprises piezoelectric material in a manner such that flexing of sensor 44 will impart stress to the piezoelectric material which is detectable by sensing circuitry 78.

According to FIG. 4, toner sensor 44 has a toner sensing element 60 formed at least in part by piezoelectric material since piezoelectric materials have a desirable characteristic in that they generate an electrical output when they are subjected to mechanical stress. Additionally, the converse is also true; namely, the application of an electric field will cause the material to deform.

As shown in FIG. 4, driving circuitry 76 is used to send a driving signal via line 70 to the driving electrode pad 66, on each side of element 60, causing piezoelectric film element 60 to vibrate when an oscillating signal is delivered with an opposite charge to each side of element 60. Optionally, the same charge can be delivered to each side of element 60, via pads 66, but in an alternating manner, one side followed by the opposite side. Sensing circuitry 78 by way of line 72 is then used to detect movement of sensing element 60 via the detection of charge along sensing electrode pad 68.

Essentially, driving circuitry 76 operates via electrode pads 66 to impart an electrically driven mechanical stressing of sensing element 60, and sensing circuitry 78 detects such resulting mechanical stress via sensing electrode pads 68. However, when toner sensor 44 is immersed in toner, the mechanical movement of the toner sensor is greatly restrained, resulting in a detectable difference via control circuitry 74. In this manner, the presence of toner can be distinguished from the lack of toner adjacent toner sensor 44. In essence, an alternating voltage is provided via driving circuitry 76 which causes the piezoelectric material of element 60 to vibrate, with the level of resulting vibration being detected by sensing circuitry 78 so as to enable the discrimination of whether or not toner is present adjacent toner sensor 44. For example, a threshold detecting circuit can be used to detect vibration above a threshold level indicative of sensor 44 being freed from immersion in toner 34.

Also according to FIG. 4, control circuitry 74 is provided in signal communication with a central processing unit 80 and memory 82. The central processing unit 80 and memory 82 are preferably configured for implementing processing algorithms and control schemes suitable for coordinating the operation of toner sensor 44 during use.

Preferably, driving circuitry 76 comprises an amplifier and an oscillating circuit suitable for generating a driver for vibrating toner sensor 44. Preferably, the driver takes the form of an oscillating driving signal such as a sine wave, a square wave, or a sawtooth wave. Preferably, a sine wave signal having a frequency that naturally excites, or resonates, sensor 44 when free of toner 34 is used as the driver. In this case, the sensing circuitry 78 is configured to detect this specific frequency, enabling discrimination from external environmental noise. Alternatively, a single electrical pulse, or ping, can be used, particularly when implementing toner level sensing via the embodiment of FIGS. 8–13. One suitable circuit comprises a voltage-to-current converter having an amplifier, and configured to produce a variable output current. Control circuitry 74, in combination with central processing unit (CPU) 80, provides a driving voltage for driving circuitry 76.

Also according to FIG. 4, sensing circuitry 78 preferably includes an amplifier and a current-to-voltage converter suitable for detecting changes in amplitude from an output signal of sensing lead 72. Sensing lead 72 delivers the output signal that is received from each of the pair of sensing electrode pads 68 provided on opposite sides of toner sensor 44. Due to the characteristics of the piezoelectric material in film element 60, the pair of driving electrode pads 66 and the pair of sensing electrode pads 68 will collect charges having an opposite sign, but having a generally similar-shaped pulse. Therefore, the signals from each pair of electrodes can be coupled together via a differential amplifier, resulting in a generally fluctuating output signal as a result of vibrations imparted by mechanical stressing via driving circuitry 76. Alternatively, the pairs of pads 66 (and 66) can be connected in parallel in a circuit so only a single drive and ground connection are necessary for each pair.

FIG. 5 illustrates toner sensor 44 in enlarged view, and as fixedly carried along edge 62 to side wall 54 to form a cantilever beam. A driving input is delivered via drive lead 70, through wall 54 of housing 30, delivering a driving signal to driving electrode pad 66, on either side of piezoelectric film element 60. Preferably, drive lead 70 comprises a pair of leads that deliver oscillating signals having opposite charges to each of electrode pads 66. In this manner, one pad will receive a positive charge while the opposite pad will receive a negative charge, inducing mechanical stress to toner sensor 44, causing a detectable electrical charge within piezoelectric film element 60. Likewise, sensing lead 70 also comprises a pair of electrically conductive leads, each coupled with one of sensing electrode pads 68. The output signals from sensing leads 72, which correspond to detected deformation of sensor 44, will generally comprise similarly shaped oscillating signals, but with each having an opposite charge from the other.

As shown in FIG. 5, toner sensor 44 is free to move, or vibrate, between location 60' and 60" in response to application of a driving signal via lead 70 when toner sensor 44 is no longer immersed, or constrained, in powder toner. Such a construction would also work when toner sensor 44 is constructed and arranged to be immersed within a fluid utilized in an image-forming apparatus. Fluid typically has a very viscous property which would be suitable for detection with the toner sensor 44 of this invention. When the toner sensor is present within the fluid, the resulting mechanical motions would be highly damped, resulting in a detectable difference in excitation frequency when the toner sensor 44 is no longer immersed in fluid.

FIG. 6 illustrates one alternative construction for the toner sensor of FIG. 5 wherein toner sensor 144 is driven by a force-generating driver 84 which applies an external force to toner sensor 144 so as to mechanically stress piezoelectric film element 60. According to one implementation, driver 84 can be a mechanical force applicator. Mechanical stressing of piezoelectric film element 60, by way of driver 84, produces charges along each of a pair of sensing electrode pads 168 on either side of film element 60. Sensing circuitry 78 detects the resulting charge-induced electrical signals via sensing lead 72, thereby enabling detection and determination of whether or not toner sensor 144 is immersed within the powder toner.

According to FIG. 6, force-generating driver 84 can be produced by any of a number of force-generating devices such as an electromechanical vibrator device which externally applies an oscillating forcing function to toner sensor 144, imparting a cantilevered vibration of sensor 144 that causes movement of film element 60 between location 60' and 60". Toner sensor 144 is affixed along edge 62 with wall 54 of housing 30. Free edge 64 is shown to freely vibrate in cantilevered fashion relative to edge 62 in response to application of force-generating driver 84. It is to be understood that any of a number of readily available force-generating drivers 84 can be utilized to impart the driving force which causes mechanical stressing of piezoelectric film element 60 to produce a detectable output signal at sensing circuitry 78. Such an output signal delivered via line 72 enables the discrimination between a toner sensor 144 that is either immersed in or free from toner.

FIG. 7 shows the construction of toner sensor 44 in an exploded and enlarged perspective view. The construction of toner sensing element 60 from a sheet of piezoelectric material so as to form a piezoelectric film element can be clearly seen. The positioning of a metallized, or conductive, layer to form driving electrode 66 and sensing electrode pad 68 on each side of sensing element 60 can also be readily seen. Pads 66 and 68 are separated by an insulatory layer so as to prevent charge transfer therebetween. Preferably, protective Mylar™ cover sheets 86 and 88 are laminated on either side of toner sensing element 60. Optionally, at least one of the protective cover sheets can be enforced so as to provide a stiff support sheet for tailoring the modal, or vibration, characteristics of resulting toner sensor 44. A stiff sheet will provide mechanical stability to sensor 44, and enable a tuning of the vibration response for a given driving input signal, or force, by adjusting the stiffness.

FIG. 8 illustrates an alternatively constructed system for detecting the presence and level of toner within a toner cartridge 16. More particularly, a toner detecting system 158 is mounted within supply reservoir 32 of housing 30, away from side wall 54 such that a top end 90 and a bottom end 92 are securely affixed to a top surface 94 and bottom surface 56 on housing 30. Preferably, toner detecting system 58 is formed from a single elongate toner sensor 244 shaped as a web that is supported within the open cavity of reservoir 32 such that toner 34 completely surrounds the toner sensor 244 about its periphery. As toner level 52 changes within reservoir 32, the length of toner sensor 244 which is no longer immersed in toner 34 also changes. The remaining portion of toner sensor 244 remaining immersed in toner 34 is not free to vibrate in response to the application of a driving force that mechanically stresses the sensor, while the free portion above toner level 52 remains free to flex or vibrate in response to application of the driving force. Preferably, an electrical pulse having a particular desirable frequency content is applied to sensor 244, and sensor 244 is monitored to detect a resulting responsive ring that indicates the free vibration characteristics of sensor 244 as immersed in toner 34.

More particularly, driving circuitry 76 (similar to that used in FIG. 4) delivers a driving signal via line 70 to drive toner sensor 244 via a pulse signal that is delivered on both sides of the toner sensor 244. Immediately after delivering the pulse driving signal to sensor 244, the sensing circuitry 78 via line 72 listens to the signal from both sides of sensor 244 in order to detect a mechanical ring of the element of sensor 244. If element 244 is completely immersed in toner, the ring will be significantly damped, producing little or no signal. As the powder level 52 decreases, the ring will be sensed by sensing circuitry 78 as the element of sensor 244 is damped to a significantly reduced extent. Changes in the resulting ring can be monitored and calibrated such that the continuous level 52 of powder 34 can be accurately detected. Additionally, a central processing unit 80 and memory 82 cooperate with control circuitry 74 in order to choreograph the initiation of such a pulse signal and the corresponding detection of sensing circuitry 78 to detect the toner level 52 within reservoir 32. Preferably, the input signal is adjusted to have a frequency that maximizes a resulting output signal, occurring at a mechanical resonance. An adjustment circuit (not shown) can be provided to tune such frequency.

According to FIG. 8, sensor 244 can be formed from an element having a relatively low cost, somewhere in the range of 30 to 40 cents. The control circuitry 74 and associated signal lines 70 and 72 and connectors might cost in the range of 70 cents to produce commercially.

FIG. 9 illustrates toner sensor 244 in further detail wherein a toner sensing element 160 is formed from a web-shaped piezoelectric film element (similar to that used to form element 60 of FIG. 4). An electrically conductive and charge collecting driving electrode pad 166 and sensing electrode pad 168 are formed on each side of film element 160 similar to the corresponding pads provided on the toner sensor of FIG. 4. However, electrode pads 166 and 168 are formed from a generally elongate configuration corresponding to the shape of film element 160. Driving electrode pad 166 terminates in a conductive connecting lead 93, whereas sensing electrode pad 168 terminates in a corresponding conductive lead 95. Preferably, top end 90 and bottom end 92 each have structural features for securely retaining the respective edges to the housing. For example, a retaining clamp can be provided along top edge 90 and bottom edge 92 so as to securely and rigidly affix such ends to respective portions of the housing.

FIGS. 10–13 illustrate various vibration modes for toner sensor 244 as produced by various toner levels 52 within a toner supply reservoir. Since the toner sensor 244 of piezoelectric material is rigidly attached at each end within the reservoir, the resulting vibration modes produced by damping of toner produce distinguishable output signals in response to a driving input signal that enable the determination of toner being present within the reservoir, as well as the determination of the actual level of toner in existence. The toner level and presence sensor is preferably excited by a voltage source with varying frequency modes. For example, square wave, a sign wave, or a pulse can be utilized to drive toner sensor 244. However, it is necessary to optimize the voltage and frequency mode in order to impart a desired excited vibration of toner sensor 244 when at least partially immersed in toner 34. Preferably, an electric circuit according to FIG. 4 is used to drive the element of toner sensor 244 at a resonance frequency. However, the resonance frequency will change based upon the length of sensor 244 that is free to oscillate, above the toner level 52. For example, according to FIG. 10, toner level 52 is at a substantially filled capacity within the reservoir. Accordingly, a very small portion of sensor 244 is free to be driven in a vibrating mode.

In contrast, FIG. 11 illustrates a toner level 52' corresponding to the reservoir that is approximately two-thirds full of toner. Accordingly, a larger portion of sensor 244 is no longer immersed in toner, and is free to vibrate in response to an applied driving force. FIG. 12 illustrates a toner level 52' corresponding to a reservoir that is filled to approximately three-eighths its capacity with toner. Accordingly, an even larger portion of sensor 244 is free to vibrate, no longer being immersed within toner 34. Similarly, FIG. 13 illustrates an even lower level of toner 52''' corresponding to a reservoir that is only filled to one-quarter capacity. Yet even a greater percentage of sensor 244 is no longer immersed in toner, such that even less damping occurs to sensor 244 as it is driven by a forcing function via an electric current.

As shown in FIG. 8, the material movement of sensor 244 is damped to greater degrees as the level of toner 52 is increased. Essentially, the effective length of the element of sensor 244 is increased as the toner level is decreased, such that the resonant frequency decreases as a greater percentage of sensor 244 is exposed above the toner level 52. Secondary frequency modes might also be produced as the level of toner decreases. However, such secondary frequency modes can either be filtered out, or in some cases, toner sensor 244 can be designed so as to cancel out these modes to enable detection of the primary vibration. Any of a number of available algorithms can be utilized to drive toner sensor 244, enabling the detection or listening of the resonating portion of the sensor so as to generate a maximum amplitude and a more detectable output signal.

Optionally, the element of toner sensor 244 can also be driven by a pulse signal, the frequency response producing a ring which will change as the element increases/decreases in exposed length above a toner level. The actual output (or listening signal) may not necessarily be completely understood. However, for a particular toner sensor 244 design, simple laboratory experiments can be utilized to best characterize and correlate the output signals produced by varying levels of toner being present in a reservoir relative to sensor 244.

The device of FIGS. 8–13 produces a sensor 244 that is very simple, yet can continuously sense toner level within a reservoir. Alternative methods of detecting toner level are much more expensive. Additionally, such a toner sensing system enables the continuous sensing of the level of powder toner existent within a reservoir.

FIG. 14 illustrates an alternatively constructed printing device 110 configured to operate similarly to the device of FIG. 1. However, a plurality of toner cartridges 116, 216, 316 and 416 are provided about photoconductor drum 14 in order to impart four different development processes for delivering four different colors to a paper 12 being printed. More particularly, toner cartridge 116 contains a magenta-colored powder toner. Toner cartridge 216 contains a cyan-colored powder toner. Toner cartridge 316 contains a yellow-colored powder toner. Finally, toner cartridge 416 contains a black powder toner. Accordingly, a paper sheet 12 can be delivered in contact with drum 14 through four passes wherein the printhead and imaging optics 22 can deliver an appropriately charged image for transferring one of the colors during each pass. By imparting such an image for each of the four colors, a color copy can be produced. Such a device can also implement the toner detecting system 58 as disclosed in FIGS. 4 and 8.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A toner detecting system, comprising:

an image forming apparatus having a toner reservoir;

a toner sensor having a toner sensing element of elongate piezoelectric material having a bottom edge fixedly carried in the toner reservoir at a location beneath a desired toner level to be detected and a top edge carried in the toner reservoir at a location above the bottom edge and above a desired toner level to be detected, the toner sensor configured to detect a toner level condition;

a driver disposed to structurally excite at least a portion of the toner sensor when the portion is not immersed in toner, the excited portion stressing the toner sensing element so as to impart a detectable output signal indicative of the toner level condition; and a detector configured to receive the detected output signal and detect the toner level condition.

2. The toner detecting system of claim 1 wherein the toner sensing element comprises at least one piezoelectric film element having at least one conductive electrode provided on at least a side of the element, the element retained to be carried within the reservoir at an elevational location for detecting the toner level condition.

3. The toner detecting system of claim 1 wherein the toner sensor further comprises a protective cover sheet configured to electrically isolate the piezoelectric material from the toner.

4. The toner detecting system of claim 1 wherein the driver comprises a voltage source operative with varying frequency modes to impart a desired excited vibration of the toner sensor immersed in toner.

5. The toner detecting system of claim 1 wherein the sensing element comprises at least one piezoelectric film element having at least one conductive electrode provided on at least a side of the element, the element retained and positioned elevationally within the toner reservoir to detect an existing level of toner based on the extent of immersion of the sensing element within the toner.

6. The toner detecting system of claim 1 wherein the driver comprises a mechanical force applicator configured to mechanically stress the toner sensing element such that the output signal exceeds a threshold value when at least a portion of the toner sensor is not immersed in toner.

7. The toner detecting system of claim 1 wherein the driver comprises a toner driving element of piezoelectric material configured to mechanically stress the toner sensor, the toner sensing element producing the output signal with a level that exceeds a threshold value when at least a portion of the toner sensor is not immersed in toner.

8. A toner detecting system, comprising:

an image forming apparatus having a toner reservoir;

a toner sensor including an elongate element supported elevationally within the toner reservoir, a portion of the elongate element immersed in toner being damped by the toner, and a remaining portion of the elongate element being undamped;

a driver disposed to structurally excite at least a portion of the toner sensor when the excited portion is not immersed in toner, the excited portion stressing the toner sensing element so as to impart an output signal indicative of the toner level condition; and a detector configured to receive the output signal and detect the toner level condition.

9. The toner detecting system of claim 8 wherein the elongate element comprises a web of piezoelectric material having at least one sensing electrode pad configured to detect a level of toner present within the toner reservoir.

10. The toner detecting system of claim 9 wherein the elongate element further comprises at least one driving electrode pad configured to deliver an electrical driving signal to the piezoelectric material.

11. The toner detecting system of claim 10 wherein the toner sensor further comprises a protective cover sheet configured to electrically isolate the piezoelectric material, the sensing electrode pad, and the driving electrode pad from the toner.

12. The toner detecting system of claim 10 further comprising driving circuitry for delivering the electrical driving signal.

13. The toner detecting system of claim 9 further comprising sensing circuitry for detecting structural excitation of the toner sensor indicative of toner level within the toner reservoir.

14. A toner detecting system, comprising:

an image forming apparatus having a toner reservoir;

a toner sensor having a toner sensing element of piezoelectric material, the toner sensor carried within the toner reservoir and positioned to detect a toner level condition comprising a signal indicative of the position of toner level elevationally within the toner reservoir;

a driver disposed to structurally excite at least a portion of the toner sensor when the portion is not immersed in toner, the excited portion stressing the toner sensing element so as to impart a detectable output signal indicative of the toner level condition; and a detector configured to receive the detected output signal and detect the toner level condition.

15. A printing device, comprising:

an electrostatic image carrying device for carrying a latent image;

a developing unit for developing the latent image;

a toner supply reservoir for supplying a toner; and a toner presence detecting system comprising a toner sensor having a toner sensing element of piezoelectric material, the toner sensor carried within the toner reservoir and positioned to detect a toner level condition, a driver disposed to structurally excite at least a portion of the toner sensor when the portion is not immersed in toner, the excited portion stressing the toner sensing element so as to impart a detectable output signal indicative of the toner level condition, and a detector configured to receive the detected output signal and detect the toner level condition;

wherein the toner level condition comprises a signal indicative of the position of toner level elevationally within the toner reservoir.

16. The printing device of claim 15 wherein the toner sensing element comprises at least one piezoelectric film element having at least one conductive electrode provided on at least a side of the element, the element retained by a housing of the reservoir to be carried within the reservoir at an elevational location for detecting the toner level condition.

17. The printing device of claim 15 wherein the driver comprises a varying frequency voltage source operative to impart a resonance frequency excited vibration to the toner sensor.

18. A method for detecting a toner presence condition comprising the steps of:

providing an elongate piezoelectric toner sensor elevationally within a toner supply reservoir of an image forming apparatus;

driving the toner sensor with an input configured to structurally excite the toner sensor when at least a portion of the toner sensor is not immersed in toner;

detecting structural excitation of the toner sensor indicative of the presence of the level of toner adjacent the toner sensor.

19. The method of claim 18 further comprising the step of generating a toner presence condition signal in accordance with the detected toner level.

20. The method of claim 18 wherein the piezoelectric toner sensor comprises an elongate element, and further comprising the step of supporting the elongate element elevationally within the toner reservoir, such that a portion of the elongate element that is immersed in toner is damped by the toner, and a remaining portion of the elongate element is undamped.

* * * * *